Feb. 17, 1970   ISAO ASAI ET AL   3,496,346
SQUARE ROOT EXTRACTOR
Filed Oct. 20, 1965

(a) $d = Ke = KE - KK'E_r \cdot d^2$ (b) $I = K'K''E_r \cdot d$ (c) $E = \dfrac{1}{K'K''E_r}\left(\dfrac{I}{K} + \dfrac{I^2}{K'}\right)$ (d) $I = K'' K'\sqrt{K'E_r} \cdot \sqrt{E}$ INVENTORS
ISAO ASAI &
ROY F. SCHMOOCK
BY
Busser, Smith & Harding
ATTORNEYS

United States Patent Office 3,496,346
Patented Feb. 17, 1970

3,496,346
SQUARE ROOT EXTRACTOR
Isao Asai, Hatboro, and Roy F. Schmoock, Ivyland, Pa., assignors to Fischer & Porter Company, Warminster, Pa., a corporation of Pennsylvania
Filed Oct. 20, 1965, Ser. No. 498,629
Int. Cl. G06g 7/20
U.S. Cl. 235—193.5           10 Claims

ABSTRACT OF THE DISCLOSURE

A current corresponding to the square root of an input voltage is produced by converting the difference between the voltage signal and a feedback signal into a pulse train having a duty cycle proportional to the difference, multiplying the duty cycle of the pulse train by a reference signal to produce a direct current output proportional to the said difference, and amplifying the direct current signal. The feedback signal is the product of the duty cycle of the pulse train and the amplified signal. A zero suppression circuit prevents any output current from being produced when the input signal is extremely small.

---

This invention relates to a square root extractor, by which is meant an apparatus providing an output which is the square root of an input, the present invention relating to an electrical apparatus for performing this function.

While adapted for other purposes, the invention is particularly applicable to the measurement of flow when the originating signal is a pressure drop, the flow being proportional to the square root of this pressure drop. The input will then be from a differential pressure transmitter transforming the measured differential pressure into a current signal.

The general object of the present invention is to provide a device of this type, without moving parts, suitable for practical use. In accordance with the invention various subsidiary objects are attained among which there may be particularly mentioned the production of an output current highly independent of electrical load varying throughout a considerable range so that measurements may be made independently of lengths of transmission lines, provisions for accommodating an elevated zero input voltage by a de-biasing system, avoidance of errors due to drift which would generally cause errors with low level signals, etc. For the last situation an adjustable drop-out circuit is provided to maintain the output at zero until the input signal is of greater magnitude than that of a predetermined adjustable level.

Other objects relate to the utilization of a type of operation which gives highly reliable and accurate results, which along with other objects will become better apparent from a consideration of the following description, read in conjunction with the accompanying drawing in which.

Figure 3:
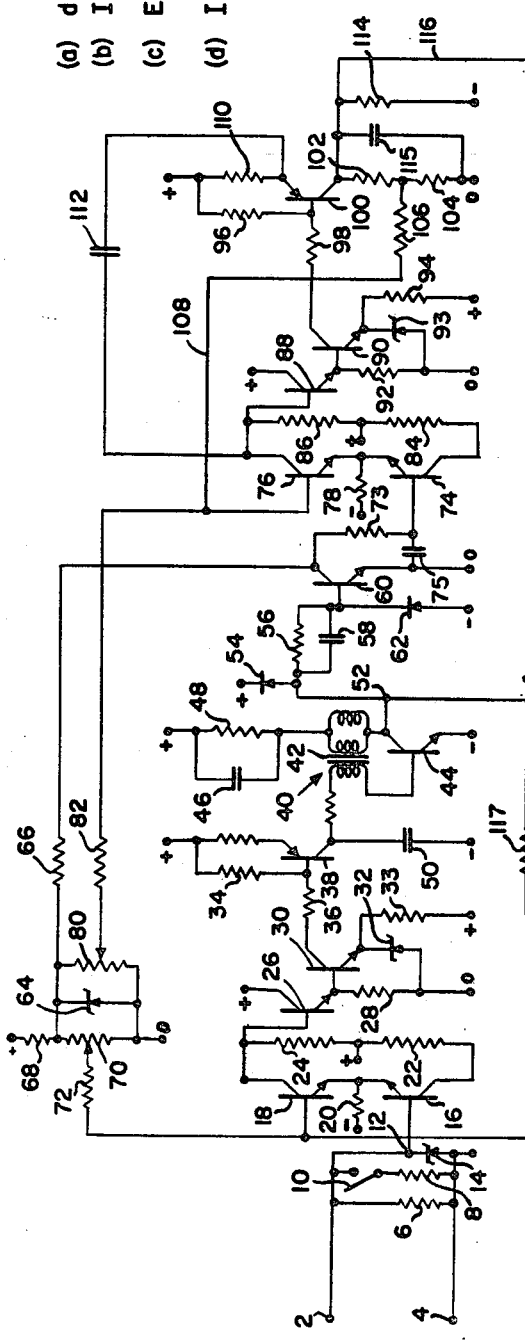

FIGURE 3 consists of a group of equations serving to explain operation.

As a background for consideration of the invention reference may be made to an elementary theory of operation explanatory of the general principles involved and from which the actual operation may be understood following consideration of the circuit.

Figure 2:
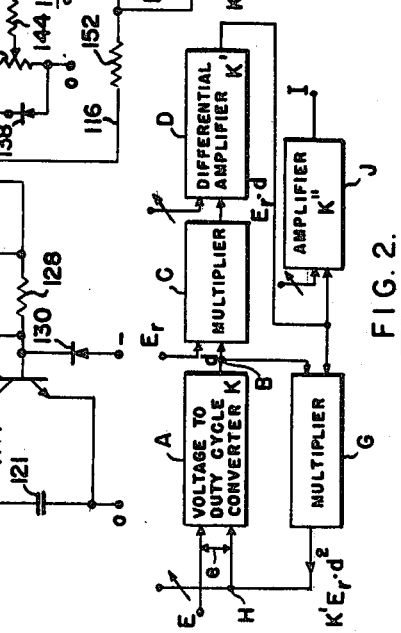
FIGURE 2 is an explanatory block diagram.

Considering FIGURE 2, E represents the input signal which may be considered derived from a current provided by a transmitter to be proportional to the variable (a differential pressure) the square root of which is to be extracted. This signal is fed into a unit A which is designated a voltage to duty cycle converter, and which has a differential amplifier input stage. E is compared with a feedback voltage introduced at H. This converter is of a type which will produce at its output B a signal $d$ which represents a duty cycle which is a function of the difference signal provided at its input, i.e. a difference signal $e$ between the voltage E and the voltage at input H. A high "gain" K here exists in the sense that the duty cycle varies to a large extent with small variations in the error voltage input.

The duty cycle controls a multiplier C which receives a fixed input voltage $E_r$, to provide an average output voltage $E_r \cdot d$. The effect of this multiplier is to produce first pulses of a magnitude proportional to $E_r$ having durations corresponding to the duty cycle, the duty cycle consisting of rapidly recurrent intervals forming parts of longer intervals, and secondly smoothing the output to provide the average. The output from the multiplier is fed to one input of a differential amplifier D, the other input of which is adjustable, as hereafter described, the differential amplifier D providing a gain K′ so that its output is $K'E_r \cdot d$. A second multiplier G receives the duty cycle signal appearing at output terminal B of the unit A and also receives the output signal from the differential amplifier D, to produce at its output terminal H the averaged signal $K'E_r \cdot d^2$. The output signal from the differential amplifier D is also fed to another amplifier J (also in practice a differential amplifier) having a gain K and giving rise to the output current I to be measured. At this point of preliminary explanation, there may be neglected the various biasing inputs and actions of other elements of the circuit which will be detailed hereafter.

Referring to the equations in FIGURE 3, Equation $a$ gives $d$ in terms of the error input $e$ to the unit A and in terms of the gains K and K′, the input signal E, the reference voltage $E_r$, and $d^2$. (A linear relationship is here expressed, but the relationship need not be linear for validity of results.)

The output current I is given in Equation $b$ which involves the output from the differential amplifier D and the gain K″ of the amplifier J.

Elimination of $d$ from the first two equations gives the Equation $c$. If the gain K is large, as it is in the actual circuit, the first term within the parentheses is negligible in comparison with the second term containing $I^2$, and thus the value for I is given by Equation $d$ from which it will be seen that it is equal to the square root of E multiplied by a constant proportionality factor.

In brief, utilizing a pair of multipliers, each of which has an input corresponding to the duty cycle, with the first having a second input which is a constant voltage and with the second having a second input which is the amplified output of the first, and by feeding back the output of the second multiplier to balance the original signal input, there is provided through the amplifier J a current output proportional to the square root of the input. By biasing and de-biasing in proper fashion, as will appear hereafter, signal levels are provided which involve essentially the same operation.

That this result is secured, along with other characteristics of the apparatus in accordance with the invention will be seen to follow from the actual circuit which will now be described.

The input signal is a direct current flowing between the terminals 2 and 4, the terminal 2 being positive. Current flow takes place through the resistor 6 which, for change of range, may be parallelled by a second resistor 8 by closure of switch 10 to produce at terminal 12 with respect to a reference zero a potential delivered to the base of a transistor 16, the potential being desirably limited by the use of a Zener diode 14. Transistors 16 and 18 are the input transistors of a differential amplifier, the emitters of which transistors are connected together and through the common resistor 20 to a negative potential source. (Supply terminals are marked as positive and negative with respect to the reference zero, and at these terminals suitable potentials are applied, differing in different parts of the system, and provided by regulated supply means which is conventional and need not be shown or described in detail.) The collectors of transistors 16 and 18 are provided with the respective load resistors 22 and 24. The junction of these resistors is connected to a positive supply terminal. Output from the foregoing is taken from the collector of transistor 18 and applied to the base of transistor 26 which is an emitter follower combination with resistor 28, with output delivered to the base of another transistor 30 the emitter of which is maintained at constant potential by the Zener diode 32 and resistor 33. The collector of transistor 30 is connected to the combination of resistors 34 and 36 to provide an amplified output to the base of transistor 38, which controls in conventional fashion the blocking oscillator generally indicated at 40 and comprising the usual transformer 42 associated with the transistor 44, and associated with the RC network 46, 48. The capacitor 50 and the current fed by transistor 38 determine the duration of the off time of the duty cycle signal. The output from the blocking oscillator is provided at terminal 52. The operation to this point is as follows:

The error input (hereafter described in more detail) to the differential amplifier is transformed into a duty cycle ratio controlling operation of the blocking oscillation. Due to the amplification, very small changes in the error input will produce large changes in "on-time" pulse width appearing at 52, and there is effectively a high gain from the error input to the duty cycle which is represented by the ratio of pulse width (on-time) to the period of the pulses.

The positive pulses appearing at terminal 52 are clipped by diode 54 and delivered through the RC network 56, 58 to the base of transistor 60 to which there is also connected the negative pulse clipping diode 62.

The transistor 60 is an epitaxial transistor with very low saturation voltage. Its collector is connected through resistor 66 to the ungrounded terminal of the Zener diode 64 which maintains a constant reference voltage, being supplied from a positive supply terminal through resistor 68. This Zener diode also maintains a constant potential across the potentiometer 70, the variable contact of which is connected through resistor 72 to the base of transistor 18. This provides the previously mentioned debiasing for the elevated zero input. The output from the collector of transistor 60 is delivered through resistor 73 to the base of transistor 74 which is connected to the reference zero potential through a large capacitor 75, so that a direct potential is provided to that base. The input pulses to the base of transistor 60 serve to switch the transistor between conducting and non-conducting conditions with conduction occurring in accordance with the duty cycle already described. Accordingly, the input to transistor 74 is a direct signal corresponding to the product of the fixed reference and the duty cycle, i.e., a multiplication is effected in accordance with the preceding outlined theory.

The transistor 74 is associated with the transistor 76 to provide the input elements of a differential amplifier which is essentially similar to that previously described. The emitters of these transistors are connected together and through resistor 78 to a negative supply terminal. The collectors are connected through load resistors 84 and 86 to a positive supply terminal. The output from the collector of transistor 76 is connected to the arrangement of transistors 88 and 90, as before, the emitter of the former and the base of the latter being connected together and through resistor 92 to the reference zero potential, while the emitter of the latter transistor is connected to the reference zero potential through the Zener diode 93, supplied from a positive terminal through resistor 94. The collector of transistor 90 is connected through resistors 96 and 98 to a positive supply terminal, and to the junction of these resistors there is connected the base of a transistor 100, the collector of which is connected to the zero reference through resistors 102 and 104. the junction of which resistors is connected through resistor 106 and line 108 to the base of transistor 76, and through resistor 82 to the adjustable contact of potentiometer 80 which is across the Zener diode 64, whereby a controlled but adjustable supply is provided to the base of transistor 76 and to the junction of 102 and 104. The emitter of transistor 100 is connected through resistor 110 to a positive supply terminal. This emitter is also connected through capacitor 112 to the collector of transistor 76. The collector of transistor 100 is connected to the zero reference through filtering capacitor 115 and is connected through resistor 114 to a negative supply terminal.

The output from the collector of transistor 100 is connected through line 116 and resistor 117 to the collector of transistor 118. The output from the transistor 100 is accordingly the reference for the transistor 118 which, like the transistor 60, constitutes the active element of a second multiplier. The output from the collector of transistor 118 is connected through resistor 120 and line 122 to the base of transistor 18, a capacitor 121 acting as a filter connecting the line 122 to the zero reference.

The base of transistor 118 is connected to the terminal 52 to receive the duty cycle pulses through connection 124 and the RC network 126, 128, a diode 130 providing a limiter. Multiplication is here effected, providing as the output the product of the duty cycle by the reference appearing at the collector of the transistor 118 which is of the same type as the transistor 60.

The output circuit receives its signals from the line 116, and comprises a third differential amplifier for devices controlled thereby. The differential amplifier comprises the transistors 146 and 148. An adjustable reference potential is applied through a network between a negative potential terminal and the reference zero comprising a resistor 132 connected to a series arrangement of Zener diode 134 and a pair of compensating diodes 136 and 138 shunted by the fixed resistor 140 in series with potentiometer 142, the movable contact of the potentiometer being connected through resistor 144 to the base of transistor 146. The input line 116 is connected through a resistor 152 of a summing network to the base of transistor 148. The common resistor 150 connects the emitters of the transistors 146 and 148 to a negative supply terminal. The collector load resistors are 154 and 155.

The output from the collector of transistor 146 is connected to the transistors 156 and 158 arranged as previously described, with the output from the collector of transistor 158 connected to the base of a power transistor 162 having its emitter connected to a positive supply terminal 165 through resistor 164, the base also being connected through resistor 168 to the same terminal 165 to provide the proper static conditions. The emitter of transistor 162 is connected at 166 to the collector of transistor 146 through capacitor 169.

The positive terminal 165 and the negative terminal 167 are supply terminals from a power supply separate from that which supplies the other terminals already mentioned, and this power supply floats with respect to the other power supply without having, in itself, a zero reference terminal, though the circuitry involves a connection to the zero reference previously mentioned.

The collector of transistor 162 is connected to the positive output line 170 running to the positive output terminal 172 connected to the load which is represented by L as a resistance, this load being ordinarily a milliameter of either indicating or recording type, though it may be constituted by a device of known type for flow control or other utilization of the output. To the line 172 there is connected the collector of a transistor 174, the emitter of which is connected through Zener diode 178 to a line 180 and through resistor 176 to a positive supply terminal. (With the exception of the terminals 165 and 167, the terminals hereafter discussed are of the first mentioned power supply.) The base of the transistor 174 is connected to the line 180 through a fixed resistor 173 and an adjustable trimming resistor 181.

The base of transistor 174 is also connected to the negative output terminal 186. The base and terminal 186 are also connected to the emitter of a transistor 184 which is associated with a second transistor 182 in what will be recognized as a silicon controlled rectifier equivalent circuit. The emitter of transistor 182 is connected to the zero reference. The collector of transistor 184 is connected to the base of transistor 182 at 190 and the base of transistor 184 is connected to the collector of transistor 182 at 188. The collector of transistor 182 is connected to a positive supply terminal through resistor 192 shunted by capacitor 194. This equivalent circuit is used rather than an actual silicon controlled rectifier to provide greater sensitivity to signals from the line 180. The base of transistor 182 is connected through a switch 196 to a negative supply terminal through the series arrangement of a fixed resistor 198 and an adjustable resistor 200. The negative supply terminal 167 of the second mentioned power supply is connected through resistor 202 bypassed by capacitor 204 to the zero reference terminal of the first power supply. It is also connected to this reference zero through the potentiometer 206 and a series resistor 208. Feedback is provided from the adjustable contact of potentiometer 206 to the base of transistor 148 through the adding resistor 210 and connection 212.

Before describing the overall operation of the circuit there may be first referred to the output elements connected to the power output transistor 162, the connections involving a dropout device to provide a zero output when the delivered output signals drop below some adjustable value.

The dropout feature of the circuit is eliminated if the switch 196 is open, and operation under this condition will be first described. By reason of the connection of the terminal 186 to the base of transistor 182, the transistor 182 is conductive and the transistor 184 is also conductive. A current flow circuit through the load will then run from the positive terminal 165 through resistor 164 and transistor 162 to the line 170 leading to terminal 172. Thence current flows through the load L to terminal 186 and through both transistors 184 and 182 to the zero reference terminal connected to the emitter of transistor 182. From this the return is through resistor 202 and in parallel with the resistor 208 and potentiometer 206 to the negative supply terminal 167. This provides a feedback through the contact of potentiometer 206 to the base of transistor 148 for summation with the input from line 116. Since transistors 184 and 182 provide a low voltage drop, the base of transistor 174 will be negative relative to its emitter which is maintained positive by the Zener diode 178. The transistor 174 is accordingly cut off.

Under the aforementioned conditions the load, a meter or control device, receives current even down to low values.

If the dropout feature of the circuit is to be used, the switch 196 is closed. It will be evident that in this case there then exists a voltage dropping network between terminal 186 and the negative terminal connected to resistor 198 comprising the pair of resistors 181 and 183 above the base of transistor 182 and the series resistors 198 and 200 below this base. It will be evident that if the power transistor 162 is providing only a small current determined by the settings of the adjustable elements, the potential at the base of transistor 182 may be zero or less. So long as this condition does not occur, and the base of transistor 182 is positive, the circuit conditions will be the same as previously described, the transistors 182 and 184 conducting. However, when the potential drops to zero or a negative value at the base of transistor 182 this transistor will be cut off and with it the transistor 184, involving opening of the portion of the circuit between 186 and zero including these transistors. Because of the silicon controlled rectifier characteristic, the conductivity is either very low (corresponding merely to leakage) or is high, a switching action being thus involved. When these transistors are cut off, the potential at the base of transistor 174 becomes positive relative to its emitter and it conducts. When this conduction occurs, it provides a leakage through the closed switch 196 and resistors 198 and 200, effectively reducing to zero the voltage between terminals 172 and 186 causing the meter or control at L to indicate or correspond to a zero current value. If, however, the output from transistor 162 increases above a critical value, transistors 182 and 184 again revert to their conductive state and transistor 174 is cut off, and delivery of output proceeds in normal fashion. The value at which cutoff occurs may be set by adjustment of resistance 200 together with the adjustment, usually preset, of resistor 183.

Figure 1:
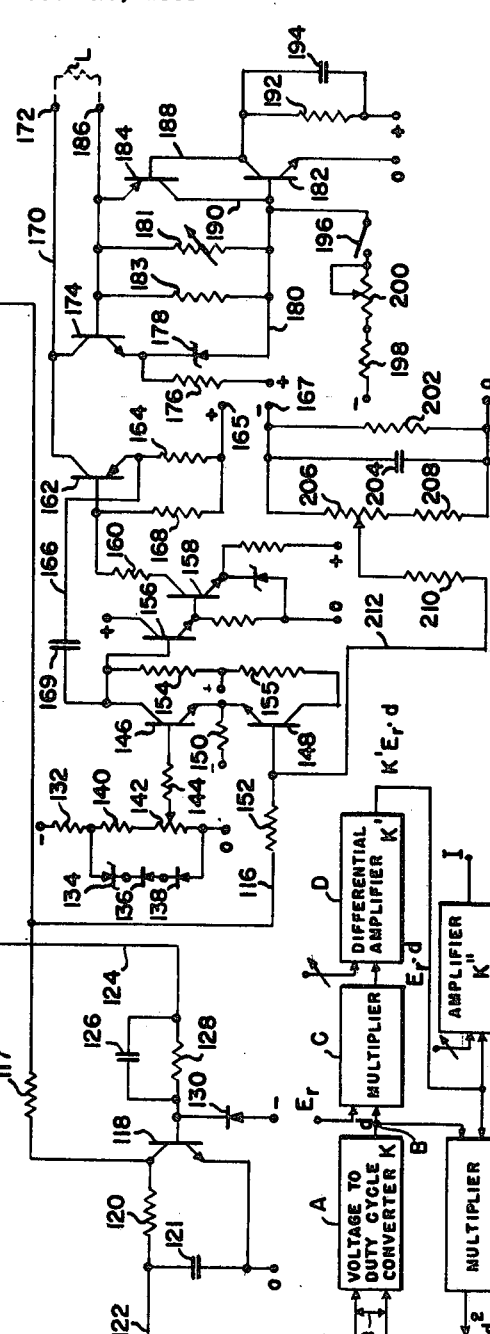
FIGURE 1 is a schematic diagram of the apparatus showing its electrical details.

The operation of the circuit as a whole may now be described as follows:

Referring to FIGURE 2 as well as to FIGURE 1, the voltage to duty cycle converter designated A comprises the elements running from the transistors 16 and 18 through the blocking oscillator to the terminal 52. In view of the fact that the input between the terminals 2 and 4 is normally from a device which from zero to 100% of its scale provides a range of current such as from four to twenty milliamperes or ten to fifty milliamperes, i.e., such that a zero value of the variable (differential pressure) corresponds to a current such as four or ten milliamperes, de-biasing must be provided to bring the input of the present apparatus effectively to zero when the input variable is zero. This is accomplished by the application to the base of the transistor 18 of a bias through the adjustment and setting of the contact of potentiometer 70, a constant bias being provided under the control of the Zener diode 64. While a differential amplifier is used, it may be noted that it is, effectively, an amplifier providing an ideal adding function at its input. As has already been described, the differential amplifier comprising the input transistors 16 and 18 and the following stages provides, within the range of error signals of significance, a linear control of the blocking oscillator 40 to provide at 52 a duty cycle proportional to the error signal designated $e$ in FIGURE 2, the duty cycle in that figure being designated $d$.

The multiplier C is constituted by the transistor 60 and its accompanying elements. As pointed out this transistor is of a type having a low saturation characteristic and is supplied with a fixed reference through resistor 66 from the Zener diode 64. The result is that at the collector of transistor 60 a signal appears in the form of a rectangular wave of fixed amplitude with fixed duration of its pulses having an average value proportional to the reference voltage times the duty cycle as indicated between C and D in FIGURE 2, the average value being supplied to the transistor 74 of the following differential amplifier by virtue of the filtering action of the capacitor 75.

The following differential amplifier D running from the transistors 74 and 76 to the line 116 provides a high linear gain to give the output indicated in FIGURE 2. It will be noted that the transistor 76 has an adjustable fixed signal to its base through resistor 82 from the contact of potentiometer 80 across which the Zener diode 64 maintains a constant potential. The adjustment of this potentiometer is to take care of steady zero shift conditions in the differential amplifier, otherwise having no functional significance. The feedback through capacitor 112 and other elements of this differential amplifier take care of maintaining it stable and linear.

The connection from terminal 52 running through connection 124 feeds the duty cycle to the multiplier G which comprises the transistor 118 and its associated elements. The action of this multiplier corresponds to that of the multiplier C except that instead of a fixed reference voltage the collector of transistor 118 received the output from the differential amplifier D through the resistor 117. The multiplication which occurs is indicated at the left of multiplier G in FIGURE 2 and is fed to the amplifier A through the connection 122 to the base of transistor 18 whereat it is added to the de-biasing input previously mentioned, smoothing to provide an average being effected by the capacitor 121.

From reference to FIGURE 2 and to the equations given in FIGURE 3, it will be seen that the circuit arrangement produces the results initially discussed, controlling the operation to provide the input to the amplifier J which is constituted by the third differential amplifier beginning with the transistors 146 and 148 and running through the output arrangement, including the drop-out system previously described in detail. In the output system re-biasing is effected through the connections to the base of transistor 146 from the adjustable contact of potentiometer 142 and its associated elements which maintain a constant voltage across it.

It may be noted that the potentiometer 206 provides a span adjustment by control of the proportional magnitude of the input to the base of transistor 148 through resistor 210 and connection 212.

By reason of the current control which is effected by the output circuit, the output current is highly independent of the load indicated at L which, from the standpoint of the system includes, effectively, resistances which may occur in a transmission line. The current through the utilization device at L is thus highly independent of lengths of leads so that the system may be used under widely varying conditions of distance of transmission.

It will be evident from the foregoing that the objects of the invention originally described are attained.

Obviously, various changes in circuitry may be adopted without departing from the invention as defined in the following claims.

What is claimed is:

1. A square root extractor comprising means receiving a first electrical input substantially proportional to a quantity of which the square root is desired and a second electrical input and providing an output which is a function of the difference of said inputs, means receiving said output and providing an output in the form of a train of pulses the quotient of the duration of said pulses when divided by their period being substantially proportional to said difference, first multiplication means providing an output having an average value proportional to the product of a fixed reference signal with said quotient, a second multiplication means providing an output having an average value proportional to the product of the output of the first multiplication means by said quotient, and means delivering the last mentioned output to the first mentioned means as its second electrical input, so that the average output of the first multiplication means is substantially proportional to the square root of said quantity.

2. An apparatus according to claim 1 in which said means providing an output in the form of a train of pulses is a blocking oscillator.

3. An apparatus according to claim 1 in which the first mentioned means is a differential amplifier.

4. An apparatus according to claim 1 in which the first multiplication means comprises a transistor having low saturation characteristics to provide a constant amplitude rectangular wave output.

5. An apparatus according to claim 1 in which the second multiplication means comprises a transistor having low saturation characteristics to provide a constant amplitude rectangular wave output.

6. An apparatus according to claim 1 in which both of said multiplication means comprise transistors having low saturation characteristics to provide constant amplitude rectangular wave outputs.

7. An apparatus according to claim 1 comprising means receiving the average output of the first multiplication means and providing an output only when the output of the first multiplication means exceeds a predetermined value.

8. An apparatus according to claim 1 comprising means, including a triggered device, receiving the average output of the first multiplication means and providing an output only when the output of the first multiplication means exceeds a predetermined value.

9. Measuring apparatus comprising means having an input receiving signals to be measured and having an output providing a current having a predetermined functional relationship to said received signals, measuring means receiving said current for indication thereof, and means bypassing said current from said measuring means only when its value drops below a predetermined value to produce then a zero indication by said measuring means.

10. Apparatus according to claim 9 comprising triggering means providing sharp transition between the condition of operation for which the measuring means provides a measuring indication and the condition of operation for which it provides a zero indication.

References Cited

UNITED STATES PATENTS

| | | | |
|---|---|---|---|
| 2,817,816 | 12/1957 | Medlar | 324—131 |
| 3,016,197 | 1/1962 | Newbold | 235—151.34 X |
| 3,257,616 | 6/1966 | Andrushkiw et al. | 324—131 |

MALCOLM A. MORRISON, Primary Examiner

JOSEPH F. RUGGIERO, Assistant Examiner

U.S. Cl. X.R.

235—151.34